United States Patent Office 3,740,385
Patented June 19, 1973

3,740,385
N-TERMINAL DERIVATIVES OF SECRETIN
Miguel Angel Ondetti, 265 Hamlin Road,
North Brunswick, N.J. 08902
No Drawing. Continuation-in-part of abandoned application Ser. No. 827,962, May 26, 1969. This application May 7, 1970, Ser. No. 35,598
Int. Cl. C07c 103/52; C07g 7/00
U.S. Cl. 260—112.5        6 Claims

ABSTRACT OF THE DISCLOSURE

Disclosed herein are novel N-terminal derivatives of the peptide secretin, intermediates thereof and a process for their preparation. The secretin derivative of this invention are useful as antacids in hyperacidic conditions of the stomach and duodenum.

RELATED APPLICATION

This application is a continuation-in-part of my co-pending application Ser. No. 827,962 filed May 26, 1969, now abandoned.

This invention relates to derivatives of the peptide secretin, salts thereof and intermediates therefor. Porcine secretin has the formula:

His-Ser-Asp-Gly-Thr-Phe-Thr-Ser-Glu-Leu-Ser-
 1   2   3   4   5   6   7   8   9  10  11

Arg-Leu-Arg-Asp-Ser-Ala-Arg-Leu-Glu($NH_2$)-Arg-
 12  13  14  15  16  17  18  19    20    21

Leu-Leu-Glu($NH_2$)-Gly-Leu-Val—$NH_2$
 22  23    24     25  26   27 and hence it is a peptide containing 27 amino acid residues containing the amino acids: L-histidine (His); L-aspartic acid (Asp); L-serine (Ser); glycine (Gly); L-threonine (Thr); L-phenylalanine (Phe); L-glutamic acid (Glu); L-glutamine [Glu($NH_2$)]; L-leucine (Leu); L-arginine (Arg); L-alanine (Ala); and L-valinamide (Val—$NH_2$).

This peptide is subject to enzymatic attack causing its action to be of short duration due to degradation. It has been discovered that secretin derivatives of the Formula I:

R—secretin wherein R is a carboxylic acid, an amino acid, or a dipeptide show activity of longer duration than secretin.

The R—secretin and salts thereof can be prepared synthetically by synthesizing intermediates of varying lengths and combining them until the desired R—secretin is formed.

In accordance with the process of this invention, R—secretin may be prepared synthetically beginning with L-valinamide and adding the remaining amino acids, one at a time or in groups, to form the desired derivatives. Such addition is accomplished by protecting the amino group in the amino acid to be added, as by activating the carboxylic acid group in such amino acid, as by converting it to its benzyloxycarbonyl derivative and converting it to its nitrophenyl ester derivative, and then interacting the amino acid with a previously prepared peptide in the chain, after removing the protecting group originally present in the peptide.

The compounds of the invention may also be prepared according to the equation:

$R_1$—His—Ser—Asp—Gly
+
Thr—Phe—Thr—Ser—Glu—Leu—Ser—Arg—
Leu—Arg—Asp—Ser—Ala—Arg—Leu—Glu($NH_2$)—
Arg—Leu—Leu—Glu($NH_2$)—Gly—Leu—Val—$NH_2$
↓
$R_1$—secretin wherein $R_1$ is a carboxylic acid, an amino acid, or a dipeptide.

The above equation takes into consideration that the proper protection of the required moieties is followed.

In addition when an acid is utilized, the desired acid may be reacted with secretin according to the equation:

$R_2$—COX+Secretin→$R_2$—CO—Secretin wherein $R_2$ is lower alkyl (e.g., methyl, ethyl, isopropyl, hexyl), aryl (e.g., phenyl or naphthyl), substituted phenyl (e.g., o-chlorophenyl, p-ethylphenyl, m-trifluoromethylphenyl, m-nitrophenyl), aralkyl (e.g., benzyl or phenethyl), lower alkoxy (e.g., methoxy, ethoxy, butyloxy or heptyloxy), aryloxy (e.g., phenoxy, naphthyloxy or substituted aryloxy) or aralkyloxy (e.g., benzyloxy) and X is a residue designed to increase the reactivity of the carboxyl group described below.

Among the suitable activating groups may be mentioned any group which causes the acidic function to become more reactive, such as mixed anhydrides (for example, an acyl amino acid and isovaleric acid), azides, acid chlorides, reaction products with carbodiimides, reactive N-acyl compounds, O-acyl hydroxylamine derivatives, and active esters, such as alkyl esters with electron attracting (negative) substituents, vinyl esters, enol esters, phenyl esters, thiophenyl esters, nitrophenyl esters, 2,4-dinitrophenyl esters, trichlorophenyl esters, and nitrophenylthiol esters. The use of nitrophenyl esters is particularly preferred from the standpoint of yield, lack of by-products, and consequent ease of purification.

In forming peptide sequences of this invention, the amino functions may be protected by commonly used amino protecting groups such as benzyloxycarbonyl, nitrobenzyloxycarbonyl, methoxybenzyloxycarbonyl, tertiary butyloxycarbonyl, phthalyl, o-nitrophenylsulfenyl, tosyl, and so forth. Methyl, ethyl, propyl, tertiary butyl, benzyl, nitrobenzyl, trimethylbenzyl, etc., may be used to protect the carboxyl groups. The hydroxyl protecting groups may be benzyl, tert. butyl, tetrahydropyranyl, and so forth, and the guanidine protecting groups may be nitro, tosyl, p-nitrobenzyloxycarbonyl, protonation, and so forth. A plenary listing of suitable protecting groups for the amino, carboxyl and hydroxyl functions may be found in "Peptide Synthesis" by Bodanszky and Ondetti, pp. 21-74.

The protecting groups are removed by known reactions such as reduction with sodium in liquid ammonia, hydrogenolysis (for instance, in the presence of a palladium on charcoal catalyst), treatment with a hydrohalo acid (such as hydrobromic or hydrochloric acids) in acetic acid or treatment with trifluoroacetic acid.

To prepare the free amines after treatment with a hydrohalic acid in acetic acid, the hydrohalide salt is treated either with an ion exchange resin such as Amberlite IR400 or so neutralized with an amine such as triethylamine.

The above mentioned peptide salts include, for instance, hydrochlorides, hydrobromides, acetates, fluoroacetates, such as trifluoroacetate, and chloroacetates such as dichloroacetate.

Amino acid groups that may be utilized in the practice of this invention are glycine, proline, valine and L-α-aminobutyric. Aliphatic acids that can be utilized are those having less than 12 carbon atoms, e.g., tert.-butyloxycarbonic acid, acetic acid, propionic acid, and so forth. Dipeptides that can be utilized are L-Leu-Gly, L-Leu-L-Pro and L-Leu-L-Val.

The novel derivatives of secretin, formed by the processes of this invention, when administered in a manner similar to secretin are active for about twice the period of time.

The invention may be further illustrated by the following examples:

EXAMPLE 1 t-Butyloxycarbonylglycyl-L-histidyl-O-benzyl-L-seryl-L-aspartyl-glycyl Benzyloxycarbonylhydrazide The protected tetrapeptide, t-butyloxycarbonyl-L-histidyl-O-benzyl-L - seryl-L-aspartyl-glycyl Benzyloxycarbonylhydrazide, (800 mg.) is dissolved in trifluoroacetic acid (5 ml.). After about 15 minutes at room temperature, most of the trifluoroacetic acid is removed in vacuo and the residue is triturated with ether (50 ml.). The free amine-trifluoroacetate peptide is centrifuged, washed with ether, and dried in vacuo over sodium hydroxide (830 mg.).

To a solution of the trifluoroacetate (753 mg.) in dimethylformamide (6 ml.), triethylamine (0.28 ml.) is added and the solution cooled (5°) in an ice bath. t-Butyloxycarbonylglycine nitrophenyl ester (355 mg.) is added and the solution is allowed to come to room temperature. After 4 hours, another portion t-butyloxycarbonylglycine nitrophenyl ester (15 mg., 0.05 mmol.) is added. After 5 hours (total) the solvent is partially removed in vacuo. Ethyl acetate is added and the pH is adjusted to 6 with acetic acid. The solid material is filtered, washed with ethyl acetate and dried in vacuo. The title protected pentapeptide (710 mg.) is recovered.

EXAMPLE 2

Gly—His—Ser—Asp — Gly—Thr—Phe — Thr—Ser—Glu—Leu—Ser — Arg—Leu — Arg—Asp — Ser—Ala—Arg—Leu — Glu(NH$_2$) — Arg—Leu—Leu—Glu(NH$_2$)—Gly—Leu—Val—NH$_2$

Palladium on charcoal (10%, 100 mg.) is added to a solution of t-butyloxycarbonylglycyl-L-histidyl-O-benzyl-L-seryl-L-aspartylglycl benzyloxycarbonylhydrazide (330 mg.) in a mixture of methanol (20 ml.), water (10 ml.), and acetic acid (10 ml.). The suspension is stirred under a hydrogen atmosphere for 5 hours. The catalyst is filtered, and the filtrate is concentrated in vacuo. The residue is treated with absolute alcohol and concentrated in vacuo. The process is repeated three times. The residue is then triturated with ethyl acetate, filtered, washed and dried in vacuo to yield 213 mg. of t-butyloxycarbonylglycyl-L-histidyl-L-seryl-L-aspartylglycyl hydrazide.

Concentrated hydrochloric acid (0.03 ml.) is added to a solution of the protected pentapeptide hydrazide (32 mg.) in dimethylformamide (0.5 ml.) and cooled in a Dry Ice-acetone bath at —15° for 5 minutes. An aqueous 14% solution of sodium nitrite (0.05 ml.) is added and after 5 minutes, the bath is lowered to —25°. N-ethylpiperidine (0.042 ml.) is added, followed by the addition of the free tricosapeptide amide, Thr—Phe—Thr—Ser—Glu—Leu—Ser—Arg—Leu—Arg—Asp—Ser—Ala—Arg—Leu—Glu(NH$_2$)—Arg—Leu—Leu—Glu(NH$_2$)—Gly—Leu—Val—NH$_2$ (56 mg.) which is washed with dimethylformamide (0.7 ml.). The reaction mixture is stored at 5° and after 24 hours, another portion of pentapeptideazide (one-half the initial amount) is added. After a total of 48 hours, the reaction mixture is concentrated in vacuo to dryness.

The residue is dissolved in cold trifluoroacetic acid (5 ml.). After 15 minutes, standing at room temperature, most of the trifluoroacetic acid is removed in vacuo and ether is added to complete precipitation. The trifluoroacetate is purified by ion exchange chromatography on carboxymethylcellulose (25 mg.).

EXAMPLE 3 t-Butyloxycarbonyl-L-leucyl-glycyl - L-histidyl-O-benzyl-L-seryl-L - aspartyl-glycine benzyloxycarbonyl hydrazide The protected pentapeptide of Example 1 (700 mg.) is dissolved in trifluoroacetic acid (5 ml.). After 15 minutes at room temperature, most of the trifluoroacetic acid is removed in vacuo and ether added to the residue. The solid precipitate is filtered and then dried in vacuo over potassium hydroxide. This trifluoroacetate form is dissolved in dimethylformamide (5 ml.) and allowed to react with t-butyloxycarbonyl-L-leucine p-nitrophenyl ester (450 mg.) in the presence of triethylamine (0.28 ml.). After overnight standing at room temperature, the solvent is partially removed in vacuo and the product isolated by precipitation with ethyl acetate (600 mg.).

EXAMPLE 4

Leu—Gly—His—Ser—Asp—Gly — Thr — Phe—Thr—Ser—Glu—Leu — Ser — Arg — Leu—Arg—Asp—Ser—Ala—Arg—Leu — Glu(NH$_2$) — Arg—Leu—Leu—Glu—(NH$_2$)—Gly—Leu—Val—NH$_2$

The protected hexapeptide hydrazide of the previous example (350 mg.) is hydrogenated with palladium on charcoal and after conversion to the azide, it is allowed to react with the free tricosapeptide amide (56 mg.) as described in Example 2. The nonacosapeptideamide (25 mg.) is isolated, after removal of protecting group, by ion exchange chromatography.

EXAMPLE 5

Propionyl—His—Ser—Asp — Gly—Thr — Phe—Thr—Ser—Glu—Leu — Ser—Arg—Leu—Arg—Asp—Ser—Ala—Arg—Leu—Glu(NH$_2$) — Arg—Leu — Leu—Glu(NH$_2$)—Gly—Leu—Val—NH$_2$ The free heptacosapeptide amide (secretin) acetate (335 mg.) is dissolved in 3 ml. of dimethylformamide and allowed to react with propionic acid p-nitrophenyl ester (50 mg.) until the ninhydrin reaction is negative. The product is isolated by precipitation with ethyl acetate (330 mg.).

What is claimed is:

1. A peptide of the formula:

R—L-His—L-Ser—L-Asp—Gly—L-Thr—L-Phe—L-Thr-L—Ser—L-Glu—L-Leu — L-Ser—L-Leu—L-Arg—L-Asp—L-Ser—L-Ala—L-Arg—L-Leu—L-Gln—L-Arg—L-Leu—L-Leu—L-Gln—Gly—Leu—Val—NH$_2$ or a pharmaceutically acceptable acid-addition salt thereof wherein R is Gly, L-Pro, L-Val, L-α-aminobutyryl, L-Leu—Gly—, L-Leu—L-Pro—, L-Leu—L-Val—, or an acyl N-terminal amino protecting group wherein the acyl radical is derived from an alkanoic acid of up to 7 carbon atoms, benzoic acid, naphthoic acid, phenylacetic acid, phenylpropionic acid, phenylcarbonic acid, naphthylcarbonic acid, or monosubstituted benzoic acid wherein the substituent is chloro, lower alkyl, trifluoromethyl or nitro.

2. A peptide of claim 1 wherein R is Gly, L-Pro, L-Val or L-α-aminobutyric or L-Leu—Gly—, L-Leu—L-Pro—, or L-Leu—L-Val— or an N-terminal amino protected R-secretin wherein R is as defined above wherein the N-terminal amino-protecting group is an acyl radical derived from a lower alkanoic acid of up to 6 carbon atoms, benzoic acid, substituted benzoic acid wherein the substituents are chloro, lower alkyl, trifluoromethyl, or nitro, naphthoic acid, phenylacetic acid, phenylpropionic acid, lower alkyl carbonic acids of up to 7 carbon atoms, phenylcarbonic acid, naphthylcarbonic acid, or benzylcarbonic acid.

3. A process for preparing a peptide according to claim 1 which comprises coupling the N-terminal amino acid of secretin to the C-terminal group of an N-protected amino acid or to the C-terminal group of an N-protected dipeptide under effective peptide coupling conditions.

4. A process according to claim 3 wherein the amino acid is glycine, L-proline, L-valine or L-α-aminobutyric acid.

5. A process according to claim 3 wherein the dipeptide is L-Leu—Gly—, L-Leu—L-Pro—, or L-Leu—L-Val—.

6. A process for preparing a peptide according to claim 1 which comprises coupling a peptide of the formula R₁—His—Ser—Asp—Gly wherein R₁ is Gly, L-Pro, L-val, L-α-aminobutyryl, L-Leu—Gly, L-Leu—L-Pro, or L-Leu—L-val, to a peptide of the formula Thr—Phe—Thr—Ser—Glu—Leu—Ser—Arg—
   Leu—Arg—Asp—Ser—Ala—Arg—Leu—Gln—Arg—
      Leu—Leu—Gln—Gly—Leu—Val—NH₂

References Cited

UNITED STATES PATENTS

| | | | |
|---|---|---|---|
| 3,400,118 | 9/1968 | Bodanszky et al. | 260—112.5 |
| 3,417,072 | 12/1968 | Bodanszky | 260—112.5 |
| 3,509,120 | 4/1970 | Bodanszky et al. | 260—112.7 |
| 3,528,960 | 9/1970 | Haas | 260—112.7 |
| 3,558,590 | 1/1971 | Cort et al. | 260—112.5 |
| 3,445,447 | 5/1969 | Sakakibara | 260—112.5 |
| 3,450,687 | 6/1969 | Hobbs | 260—112.5 |

OTHER REFERENCES

Vanamee et al., J. Surg. Res. 6, 126–131 (1966).

Ondetti et al., J. Amer. Chem. Soc. 90, 4711–4715 (1968).

Ondetti et al., Pharmacology of Hormonal Polypeptides and Proteins, Bach et al. eds., Plenum Press, New York (1968). Pp. 18–31.

Bodanszky et al., J. Amer. Chem. Soc. 89, 6753–6757 (1967).

Jorpes et al., Biochem. Biophys. Res. Commun. 9, 275–279 (1962).

LEWIS GOTTS, Primary Examiner

R. J. SUYAT, Assistant Examiner

U.S. Cl. X.R.

424—177